Dec. 1, 1953   W. H. WANNAMAKER, JR., ET AL   2,661,454
CONTROL APPARATUS
Filed March 12, 1948   3 Sheets-Sheet 1

INVENTORS
WILLIAM H. WANNAMAKER JR.
JAMES C. MOUZON
BY
Arthur H. Swanson
ATTORNEY Dec. 1, 1953    W. H. WANNAMAKER, JR., ET AL    2,661,454
CONTROL APPARATUS
Filed March 12, 1948          3 Sheets-Sheet 3
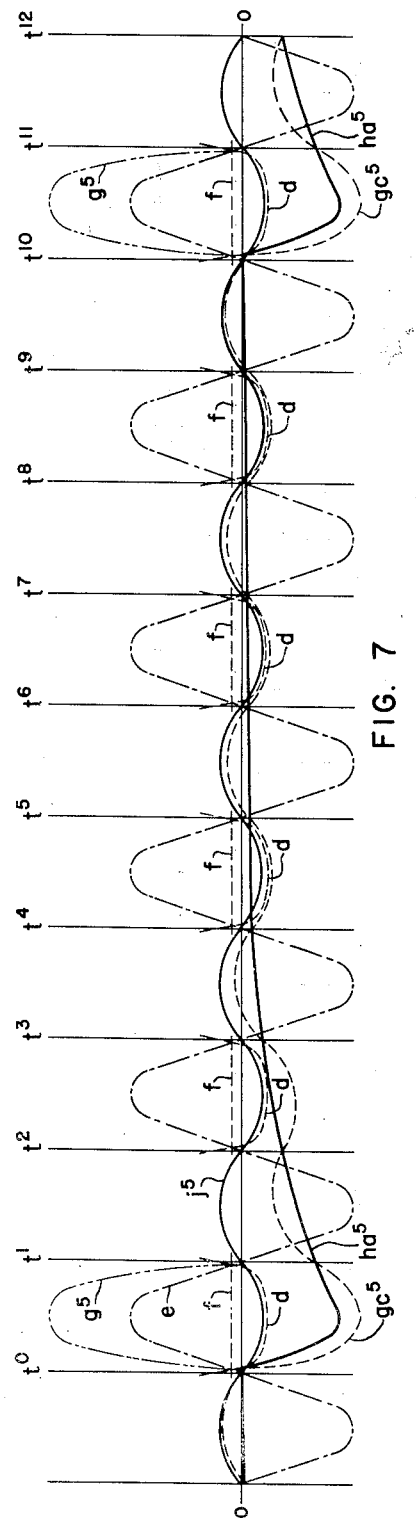
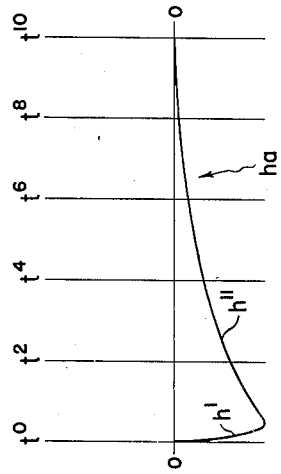
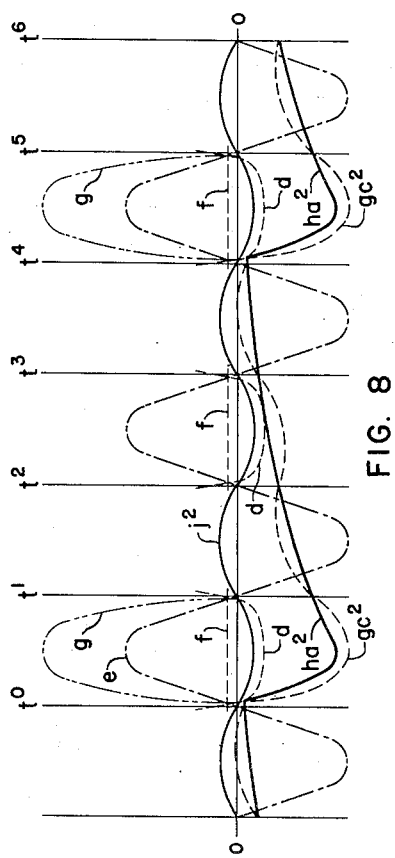
INVENTORS
WILLIAM H. WANNAMAKER JR.
JAMES C. MOUZON
BY
*Arthur H. Swanson*
ATTORNEY Patented Dec. 1, 1953

2,661,454

UNITED STATES PATENT OFFICE 2,661,454

CONTROL APPARATUS

William H. Wannamaker, Jr., Flourtown, and James C. Mouzon, Wyndmoor, Pa., assignors, by mesne assignments, to Minneapolis-Honeywell Regulator Company, Minneapolis, Minn., a corporation of Delaware Application March 12, 1948, Serial No. 14,416

3 Claims. (Cl. 323—66)

The present invention relates to electric control apparatus comprising means for automatically regulating an electric current, and the general object of the invention is to provide improved apparatus for varying an electric current in predetermined accordance with changes in a control quantity or condition. More specifically, the object of the present invention is to provide improved means for regulating the output current of an electronic valve of the thyratron type, so as to vary the average value of said current, and thereby produce graduated control effects in response to variations in a control quantity.

In our prior application, S. N. 745,006, filed April 30, 1947, now Patent No. 2,528,626 of November 7, 1950, we have disclosed and claimed novel apparatus in which the output current of a thyratron is employed as a heating current and is varied in response to the temperature of the apparatus heated by the current, and in which said heating current is used to regulate the temperature of the metallic body of a radiation pyrometer in the general manner in which the temperature of such a body is regulated in an application of Thomas R. Harrison, S. N. 658,163, filed March 29, 1946.

The primary object of the present invention is to provide apparatus of the general type disclosed in our prior application but having better operating characteristics. A specific object of the present invention is to provide apparatus of the general character disclosed in our said prior application including improved means for regulating the heating current as required to minimize errors in the pyrometer temperature measurements due to variations in the ambient temperature or due to the radiation of heat between the pyrometer and sources other than the source to be measured.

In the preferred form of the improved apparatus disclosed herein, as in the apparatus disclosed in our said prior application, the element for heating the pyrometer body is a resistance heating coil connected in series with an electronic valve of the thyratron type and with a source of alternating current, and is associated with control apparatus by which the thyratron is caused to fire at intervals automatically varied in periodicity as required to provide a control of the heating current supplied to the heating element in graduated response to the heating effect needed. One specific object of the present invention is to provide improved means for providing the thyratron with a suitable negative grid-cathode bias which is desirably constant and independent of variations in the current flow in the bridge associated with the thyratron. Another specific object of the invention is to provide an improved and simplified coupling connection between said bridge circuit and the amplifier associated therewith. Still another specific object of the present invention is to provide improved means comprising a bias resistor and by-pass condenser associated with the cathode of the thyratron for subjecting the heating resistance to proportional control and to obtain other advantageous results as hereinafter explained.

The various features of novelty which characterize our invention are pointed out with particularity in the claims annexed to and forming a part of this specification. For a better understanding of the invention, however, its advantages, and specific objects attained with its use, reference should be had to the accompanying drawing and descriptive matter in which we have illustrated and described a preferred embodiment of the invention.

Of the drawings:

Fig. 6 is a curve of negative cathode bias voltage vs. time for the disclosed apparatus; and Figs. 7 and 8 are diagrams illustrating voltage and current relations under the respective operating conditions in which heat is being supplied to the pyrometer body at a minimum rate and at a rate intermediate the maximum and minimum rates.

Figure 1:
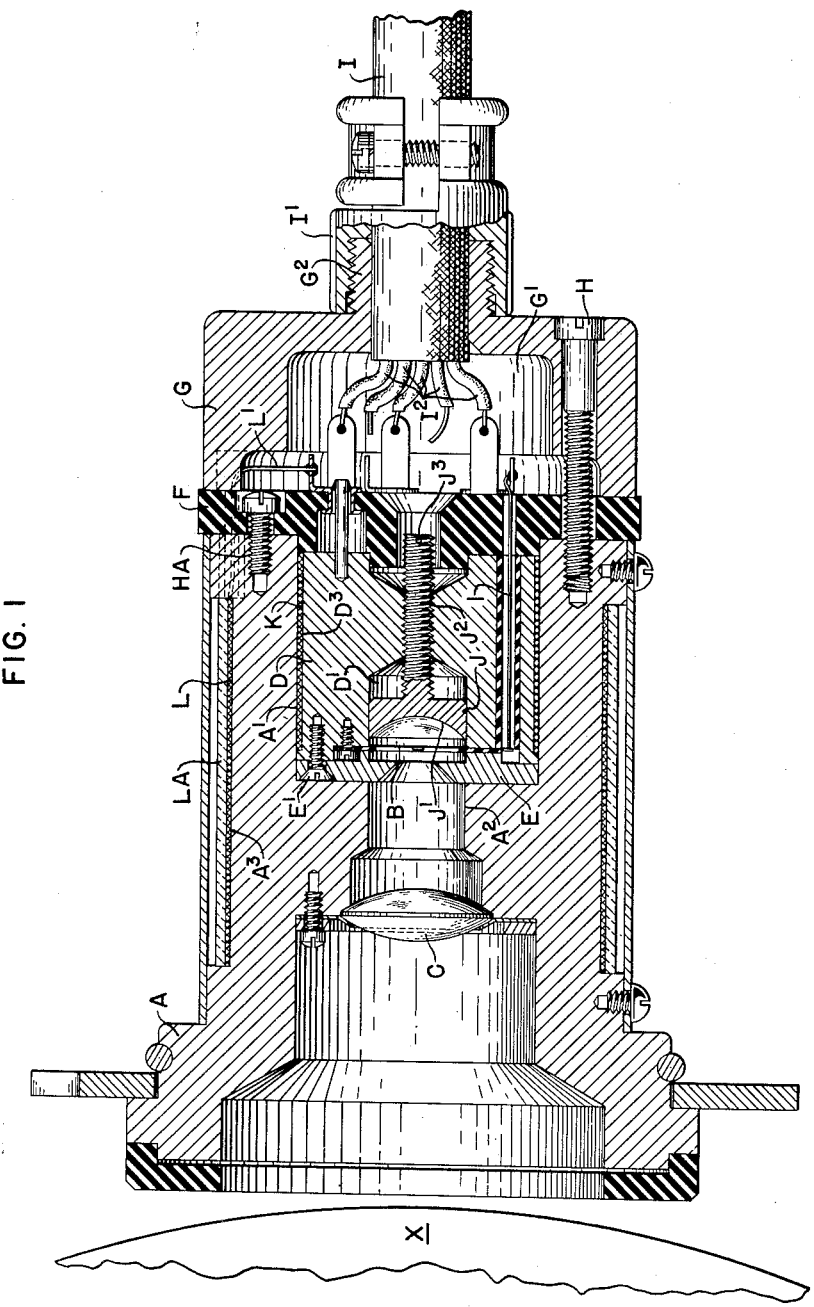
Fig. 1 is an elevation in section of a pyrometer with which the present invention may be used.

In Fig. 1 we illustrate, by way of example, a radiation pyrometer structure of the type disclosed and claimed in the copending application of Clarence A. Dyer, Serial No. 725,847, filed February 1, 1947, and now Patent No. 2,562,538 of July 31, 1951. The pyrometer of Fig. 1 includes a resistance heating coil L for heating the pyrometer housing body A, and in Fig. 2 we diagrammatically illustrate the use of a preferred form of the present invention in controlling the temperature of the body A. The body A is a relatively massive metallic part formed of aluminum or other metal of good heat conductivity, and is chambered to provide a space in which a thermopile B and a lens C are mounted. Heat rays received from an external body X are received and focused on the thermopile B by the lens C.

As shown, the thermopile B is supported by and forms a part of an assembly unit comprising a cylindrical body element D, an annular thermopile retaining element E, secured by screws E' to the front end of the body D, and a terminal disc F secured by screws (not shown) to the rear end of the body D. The elements D and E are formed of aluminum or other good heat conducting metal, and the disc F is formed of insulating material such as Bakelite. The unit including the members D, E and F is adapted for insertion in and removal from a cylindrical chamber A' extending into the body A from its rear end and coaxial with the lens C. The chamber space A' is larger in diameter than a chamber space A² which extends between the space A' and the lens C.

The thermopile B comprises a plurality of thermocouples having their hot and cold junctions arranged and disposed in the pyrometer body A generally as disclosed in the Thomas R. Harrison patent, No. 2,357,193, of August 29, 1944. The hot junctions of the thermopile B are flattened and disposed in the central portion of the chamber A', and the cold junction portions are clamped between the retaining member E and the annular portion of the member D which surrounds a mirror chamber D' in the front end portion of the member D. The various thermocouples are connected in series with one another between a terminal conductor 1 and a second terminal conductor, not shown. Those conductors extend rearwardly from the thermopile through longitudinal passages, formed in the member D and lined with insulating material, and through registering openings formed in the member F, and are respectively attached to corresponding terminal parts supported by the member F.

The heating coil or resistor L is wound in a grooved portion A³ provided in the body A, and is covered by a layer of asbestos insulation LA. The ends of the coil L pass through the body A as insulated conductors, one of which is shown at L' in Fig. 1, and terminate at respective terminal parts on the member F.

A thermometer resistance K is wound in a grooved portion D³ of the member D, and is responsive to the temperature of the body A and the parts thereof. The ends of the thermometer resistance K pass through the body A as insulated conductors and terminate at respective terminal parts on the member F.

The previously mentioned terminal parts serve to connect conductors at the opposite sides of the disc F, and are mounted in the latter and extend into a chamber space G' formed in a cap-shaped cover or end member G. The latter is detachably secured to the rear end of the body A by bolts H which extend through the cap member G and through registering openings in the disc F and are screwed into threaded sockets formed in the body A. The disc F is separately secured to the body A by bolts or screws HA. The end member G is formed with an axial passage surrounded by an externally threaded tubular boss G² engaged by a cable clamp I' for anchoring in place the body of a cable I extending into the chamber space G'. The end of each of the conductors I² included in the cable I is connected to a corresponding one of said terminal parts. Since the thermopile B may be similar in type and form to the thermopile illustrated and described in detail in said prior Patent No. 2,357,193, it need not be further illustrated or described herein.

The previously mentioned chamber D', formed in the front end portion of the member D, receives a mirror formed by the polished concave front end surface J' of a stainless steel mirror body J. The latter is provided at its rear side with a threaded stem or spindle J² threaded in and extending through a threaded axial passage formed in the portion of the member D at the rear of the chamber D'. The rear end of the stem J² is formed with a slot or kerf J³, and when the cap member G is removed, a screw driver may be placed in the kerf J³ to rotate the stem J² and thereby axially adjust the mirror J toward and away from the thermopile B.

Figure 2:
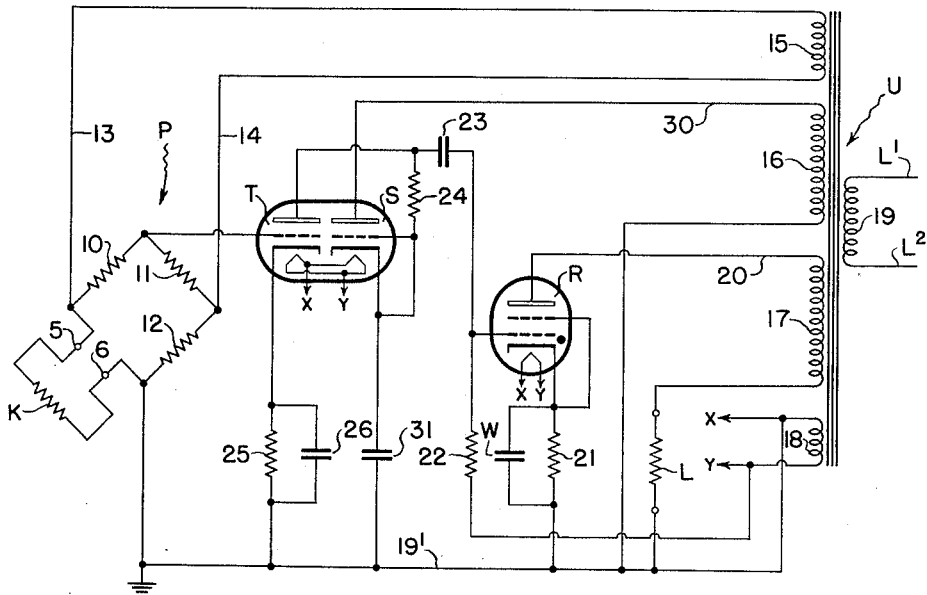
Fig. 2 is a circuit diagram illustrating an automatically controlled heating system for the pyrometer body shown in Fig. 1.

In the preferred arrangement for regulating the current flow in the heating resistor L in accordance with the temperature of the thermometer resistance K, illustrated diagrammatically in Fig. 2, the thermometer resistance K forms part of a resistance bridge P which controls the firing of an electronic valve R which is of the thyratron type and has the heating resistor L in its output circuit. The means through which the thyratron is controlled comprises an electronic rectifier S supplying anode current to an electronic amplifier triode T and energized by an alternating current transformer U. The transformer U also supplies energizing current to the bridge P and supplies anode current to the thyratron R. A condenser W, connected in parallel with a cathode bias resistor 21 in the output circuit of the thyratron R, cooperates with the other elements of the control system to determine the frequency with which the thyratron R is made conductive and fires. As is hereinafter explained, said firing frequency is thus varied as required to provide proportional control of the heat produced by the heating resistor L in response to the temperature measured by the thermometer resistance K.

The thermometer resistance K forms one of the four arms of the resistance bridge P, the other arms being formed by resistors 10, 11, and 12. As shown, one end of the thermometer K resistance is connected by a terminal member 5 to one end of the resistor 10, and the other end of the resistance K is connected by a terminal member 6 to one end of the resistor 12. The second end of the resistor 12 is connected by the resistor 11 to the second end of the resistor 10. The point at which the thermometer resistance K and the register 10 are connected constitutes one input terminal of the bridge P, and the second input terminal of the bridge is formed by the junction point of the resistors 11 and 12. The input terminals of the bridge P are connected by conductors 13 and 14, respectively, to the terminals of a secondary winding 15 of the transformer U. The transformer U has three other secondary windings, 16, 17, and 18, and has a primary winding 19. The primary winding 19 is connected across supply conductors L' and L², which may form part of a power distribution system supplying to the apparatus alternating current of conventional frequency and voltage, for example, 60 cycles per second and 115 volts.

The heater resistance L is connected between a grounded conductor 19' and one terminal of the transformer secondary winding 17. The second terminal of the winding 17 is connected by a conductor 20 to the anode of the thyratron R. The latter has its cathode connected to ground through the previously mentioned bias resistor 21 and the condenser W connected in parallel with said resistor. As shown, the thyratron R is of the commercially available type 2050, which has a suitably linear grid-control characteristic. The need for such a characteristic is explained hereinafter. The thyratron R has its shield grid connected to its cathode and has its control grid connected through a fixed bias resistor 22 to one terminal of the transformer secondary winding 18. The second terminal of that winding is connected to ground. The control grid of the thyratron R is also connected by a coupling condenser 23 to the anode of the amplifier valve T. The secondary winding 18 supplies cathode heating current to the valves R, S and T by the partially-shown conductors X and Y.

The anode of the valve T is connected through a plate load resistor 24 to the cathode of the rectifier valve S which supplies anode current to the valve T. The cathode of the valve T is connected to ground through a cathode bias resistor 25 and a bypass condenser 26 connected in parallel therewith. The control grid of the valve T is directly connected to the output terminal of the bridge P at which the bridge resistors 10 and 11 are connected. The second output terminal of the bridge P, which is the junction of the thermometer resistance K with the bridge resistor 12, is connected to ground. The anode of the rectifier valve S is connected by a conductor 30 to one terminal of the transformer secondary winding 16. The latter has its second terminal connected to ground. The cathode of the rectifier valve S is connected to ground through a filter condenser 31. The grid of the valve S is connected to the cathode thereof.

The control apparatus shown diagrammatically in Fig. 2 provides proportional control of the magnitude of the average current supplied to the pyrometer body heating resistance L. Thus in the normal operation of the apparatus, when the temperature of the pyrometer body A is lower than the predetermined normal or control point temperature, current is supplied to the resistor L at an average rate which depends on the extent to which the temperature of the thermometer resistance K is below its normal value. The average rate at which heat is supplied to the pyrometer body depends on the frequency with which the thyratron R of Fig. 2 is made conductive.

When the temperature of the thermometer resistance K is much below normal, the thyratron R fires during one-half of every complete cycle of the alternating current voltage induced in the transformer secondary winding 17, and heating current is then supplied to the heating resistance L at the maximum average rate permitted in normal operation by the design of the apparatus illustrated diagrammatically in Fig. 2. When the temperature of the thermometer resistance K is only slightly below normal, the thyratron is made conductive at a relatively low frequency and current is then supplied to the heating resistance L at a minimum average rate. The last mentioned frequency, and said minimum average rate, may be predetermined, in practice, by the design of the apparatus shown diagrammatically in Fig. 2. In a commercial form of that apparatus having the circuit element values hereinafter stated by way of example, the minimum average rate at which heating current is supplied occurs when the thyratron R fires once in every five cycles of the supply voltage. The apparatus may be so designed, however, that current will be supplied to the the resistance L at the minimum rate when the thyratron R is fired more or less frequently than once in every five cycles. The operating conditions prevailing when the thyratron is fired once in every five cycles, and heating current is supplied at the minimum average rate, are illustrated in Fig. 7 to which reference is hereinafter made.

Any significant rise in the temperature of the thermometer resistance K above that which causes the firing of the thyratron every fifth cycle makes that temperature practically equal to, or somewhat above, the normal or control point temperature, and the thyratron does not resume firing thereafter until the temperature measured by the thermometer resistance K again falls below normal.

Successive significant decreases in the temperature of the resistance K, below that resulting in the thyratron firing every fifth cycle, will progressively increase the firing frequency to once in every four, three, two, and single supply voltage cycles. A decrease in the temperature of the resistance K below that at which the thyratron fires every cycle does not change the character of the operation of the apparatus. Ordinarily the apparatus is so designed that under normal operation conditions, the firing of the thyratron once every cycle for a brief period will initiate a progressive increase in the temperature of the thermometer resistance K which will normally continue until that temperature is returned to its normal value.

The general operating characteristics of a thyratron valve of the 2050 type, or of any other commercially available type suitable for the purposes for which the thyratron R is employed, are well known. The 2050 type thyratron is well suited for such use because of its current capacity and linear grid-control characteristic. When such a conventional grid control, arc discharge electronic valve as the type 2050 thyratron is operated with alternating voltage supplied to its output or anode-cathode circuit, and with an alternating signal voltage applied to its grid-cathode or input circuit, the operation of the valve with anode-cathode and grid-cathode voltages of varying values is conveniently explained by reference to related theoretical curves, commonly referred to as critical anode-cathode and grid-cathode voltage curves.

Figure 3:
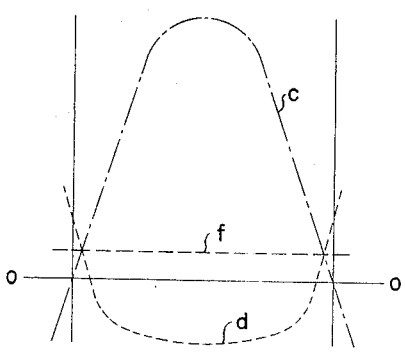
Fig. 3 is a diagram illustrating typical alternating current thyratron characteristics.

A typical pair of such curves is shown in Fig. 3, wherein c designates the critical anode-cathode voltage curve, and d designates the corresponding critical grid-cathode voltage curve.

As used herein, the term "anode-cathode voltage" means the potential difference between the plate or anode and the cathode of the valve R, and the term "grid-cathode voltage" means the potential difference between the control grid and cathode of the thyratron R. The curve d represents the locus of the grid-cathode voltage values which are just insufficiently negative to prevent the thyratron from firing when the critical anode-cathode voltage of the thyratron is that represented by the curve c. However, with an actual thyratron anode-cathode voltage smaller than the critical anode-cathode voltage, the thyratron can be prevented from firing with a grid-cathode voltage which is less negative than the critical grid-cathode voltage. The thyratron can be caused to fire also with the actual grid-cathode voltage more negative than the critical grid-cathode voltage, provided the actual anode-cathode voltage is increased above the critical anode-cathode voltage. In all cases, however, the thyratron can be caused to fire only when the anode supply voltage is greater than the thyratron ionization voltage, shown by the curve $f$, and when the voltage of the thyratron anode is positive with respect to the associated cathode.

In Fig. 3, and in Figs. 4 through 8, the line $o$—$o$ is a base line assumed to represent the ground potential, so that the voltage of any point along any voltage curve shown in any of Figs. 3-8 is positive or negative relative to the ground potential, accordingly as the point is above or below the base line $o$—$o$, and has a magnitude proportional to the vertical displacement of the point from the base line.

Figure 4:
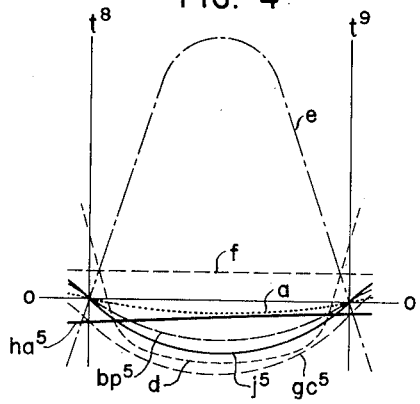
Fig. 4 is a diagram illustrating operation of the apparatus under an operating condition wherein heat is supplied to the pyrometer body at a minimum rate.
Figure 5:
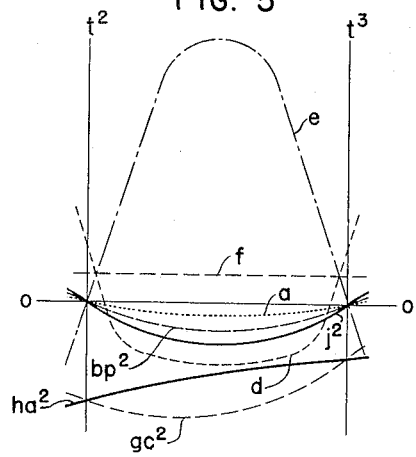
Fig. 5 is a diagram similar to that of Fig. 4 for operation wherein heat is being supplied at an intermediate rate.

For convenience in comparing conditions illustrated by Figs. 4 and 5, the portions of the anode supply voltage curves $e$ of Figs. 4 and 5 are shown as being identical with the critical anode-cathode voltage curve $c$ of Fig. 3. Fig. 4 is a reproduction on a larger scale of the portion of the anode supply voltage curve $e$, the critical grid-cathode voltage curve $d$, and the actual grid-cathode voltage curve $gc^5$ which in Fig. 7 are between the time lines $t^8$ and $t^9$. Those lines mark the beginning and end, respectively, of the first half of a supply voltage cycle in which the thyratron does not fire, but which immediately precedes a cycle in which the thyratron does fire. Similarly, Fig. 5 includes the portions of the anode supply voltage curve $e$, the actual grid-cathode voltage curve $gc^2$, and the critical grid-cathode voltage curve $d$ between the time lines $t^2$ and $t^3$ of Fig. 8. These latter time lines also represent the beginning and end, respectively, of the first half of a supply voltage cycle in which the thyratron does not fire, but which is directly followed by a cycle in which the thyratron does fire. The curve $f$ of Figs. 3 through 5 represents the ionization potential of the thyratron R. The latter cannot fire when the anode-cathode voltage is less than this potential.

The thyratron does not fire in a half cycle in which the anode-cathode and grid-cathode voltages are related as shown in Fig. 4, because in Fig. 4 the actual grid-cathode voltage shown by any point on the portion of the curve $gc^5$ between the time lines $t^8$ and $t^9$ is more negative than the voltage indicated by the point directly above it on the critical grid-cathode voltage curve $d$. The thyratron fires in the portion of the following cycle between the time lines $t^{10}$ and $t^{11}$ of Fig. 7 because the actual grid-cathode voltage curve $gc^5$ intersects the critical grid-cathode voltage curve $d$ at a point adjacent the time line $t^{10}$. The voltage relations which explain why after a firing cycle the thyratron does not fire in the fourth cycle and does fire in the fifth cycle, as shown in Fig. 7, make it apparent why the thyratron does not fire in the first cycle and does fire in the second cycle after a firing cycle, as shown in Fig. 8.

The actual grid-cathode voltage shown by the curve $gc^5$ in Figs. 4 and 7 is the resultant of three components, $a$, $bp^5$, and $ha^5$. The component $a$ is an alternating fixed bias voltage of constant value which is induced in the transformer secondary winding 18. As described hereinbefore, this winding has one terminal connected to ground and thereby to the grounded cathode of the valve R, and has its second terminal connected through the resistor 22 to the control grid of the thyratron R. The component $bp^5$ is an alternating voltage proportional to the amplified output voltage of the bridge P of Fig. 2. As is apparent from Fig. 2, the output voltage of the bridge P is in predetermined proportion to the resistance, and thereby to the temperature, of the thermometer resistance K. This bridge output voltage is substantially in phase with the anode-cathode voltage of the thyratron. The output voltage of the bridge P is impressed on the input circuit of the amplifier triode T, and the amplified and phase-reversed bridge output voltage is transmitted from the anode circuit of the valve T to the control grid of the thyratron R through the coupling condenser 23. The component $bp^2$ of the actual grid voltage $gc^2$, shown in Fig. 5, differs from the voltage component $bp^5$ of Fig. 4 only because the temperature of the thermometer resistance K is lower under the operating conditions illustrated in Figs. 5 and 8, than under the conditions illustrated by Figs. 4 and 7.

In Figs. 4 and 7, the curve $j^5$ represents the algebraic sum of the voltages of the curves $a$ and $bp^5$. Similarly, in Figs. 5 and 8, the curve $j^2$ represents the algebraic sum of the voltages of the curves $a$ and $bp^2$.

The component $ha^5$ of the actual grid-cathode voltage curve $gc^5$, shown in Fig. 4, is due to the grid bias indicated by the portion of the curve $ha^5$ between the time lines $t^8$ and $t^9$ of Fig. 7. The cathode bias curve $ha^5$ of Fig. 7 shows the variation in the voltage of the cathode of the valve R, relative to the ground potential, resulting from the charge which is put on the condenser W as a result of the current which flows through the resistor 21 when the thyratron fires. This voltage decreases towards zero as the condenser W discharges after the thyratron ceases to fire. Although this voltage actually renders the thyratron cathode positive with respect to ground, the curves $ha$, $ha^2$, and $ha^5$ of this voltage are shown as extending below the base line $o$—$o$ since this voltage is effectively a negative grid-cathode bias voltage.

In Fig. 6, the portion $h'$ of the curve $ha$ illustrates the increase in the positive potential of the cathode of the valve R relative to the ground potential and to the control grid potential which occurs during each firing operation of the valve R. The body or main portion $h''$ of the curve $ha$, at the right of the portion $h'$, represents the diminishing voltage between the thyratron cathode and ground as the condenser W discharges through the resistor 21. The curve $ha$ of Fig. 6 merges into the base line $o$—$o$ at a point during the second half of the fourth complete supply voltage cycle after the last previous firing cycle, provided the thyratron does not fire again in the meantime. Under the operating conditions illustrated in Fig. 7 in which the thyratron R fires at its minimum frequency of once in every five cycles, the curve $ha^5$ approaches very closely to the base line $o$—$o$ just before each of the successive firing operations occurs. In Fig. 8, however, in which the thyratron fires very second cycle, the cathode bias voltage indicated by the curve $ha^2$ never reaches the base line $o$—$o$, but is somewhat below the latter at the beginning of each of the firing operations occurring at the frequency of once in every two cycles.

Summarizing the above, the actual grid-cathode voltage curve $gc^5$ of Figs. 4 and 7 is the sum of the cathode bias voltage curve $ha^5$ and the curve $j^5$, the latter being the sum of the amplified bridge output voltage curve $bp^5$ and the fixed bias voltage curve $a$. Similarly, the actual grid-cathode voltage curve $gc^2$ of Figs. 5 and 8 is the sum of the cathode bias voltage curve $ha^2$ and the curve $j^2$, the latter being the sum of the amplified bridge output voltage curve $bp^2$ and the fixed bias voltage curve $a$.

The related curves $e$, $d$, $gc^5$, $j^5$, $f$, $g^5$ and $ha^5$ of Fig. 7 collectively illustrate the normal operation of the control system shown in Fig. 2 when the temperature of the thermometer resistance K is steady and slightly below the normal or control point value of that temperature. As previously explained, in Fig. 7 current is passed through the pyrometer heating resistor L at the minimum average rate permitted by the apparatus when so designed that said minimum rate is maintained by causing the valve R to fire every fifth supply voltage cycle. The thyratron fires in the first half of each of the first and sixth complete cycles of the supply voltage shown in Fig. 7. Since the actual grid-cathode voltage $gc^5$ and the critical grid-cathode voltage curve $d$, shown in Figs. 4 and 7, are substantially in phase, the firing operation begins, in each of the half cycles in which it occurs, as soon as the anode supply voltage $e$ increases slightly above the ionization potential $f$ of the thyratron, provided the actual grid-cathode voltage $gc^5$ is equal to, or less negative than, the corresponding value of the critical grid-cathode voltage. The same is true for the operation shown in Figs. 5 and 8.

At the instant at which the firing of the thyratron begins, plate or anode current $g^5$ begins to flow through the thyratron and through the resistors L and 21 included in the output circuit of the thyratron. The potential drop in the resistor 21 resulting from the flow of the current $g^5$ rapidly increases positively with respect to ground the voltage of the cathode of the valve R, and rapidly builds up a voltage across the condenser W, as is indicated by the portion $h'$ of the curve $ha$ shown in Fig. 6. As the anode supply voltage increases, the potential drop in the heating resistance L builds up and the condenser voltage $ha$ builds up. The actual thyratron anode-cathode voltage, however, ceases to follow the anode supply voltage curve $e$ but remains constant with a value approximately equal to the ionization potential $f$ of the thyratron. While the anode supply voltage $e$ builds up above the voltage $f$, the condenser voltage $ha$, which is in bucking relation with the supply voltage $e$, continues to increase, but since the thyratron control grid loses control once the thyratron has fired, this negative cathode bias voltage $ha$ cannot terminate the firing operation. The thyratron stops firing and the current $g^5$ ceases to flow between the anode and cathode of the valve R and through the heating resistor L when the anode supply voltage $e$ drops below the ionization potential $f$ of the valve R. As the condenser charge is dissipated by the current flow through the resistor 21, the voltage of the thyratron cathode returns to equality with the ground potential, as the curve $ha$ indicates. If, following the second firing operation indicated in Fig. 7, the temperature of the thermometer resistance K were to rise slightly, the thyratron firing operation would cease and would not be resumed until there was a subsequent decrease in the temperature of the resistance K. If the temperature of the latter were to remain constant following the second firing operation illustrated in Fig. 7, that operation would be repeated during the fifth subsequent supply voltage cycle.

It should be noted that although the voltage $ha$ developed across the condenser W is in opposition to the anode supply voltage $e$, the latter is only negligibly reduced by the voltage $ha$ because of the small value of the voltage $ha$ compared to that of the voltage $e$.

The operation of the apparatus under the conditions illustrated by Fig. 8 is similar to that occurring under the conditions illustrated in Fig. 7, except that under the Fig. 8 conditions the grid-cathode voltage component $bp^2$ shown in Fig. 5, is substantially less negative than the component $bp^5$ shown in Fig. 4. In consequence, the second firing operation illustrated in Fig. 8 occurs while the negative cathode bias represented by the curve $ha^2$ is substantially greater than it can be to allow firing under the conditions illustrated in Fig. 7. As will be apparent, and as the curves $g^5$ and $g$ shown in Figs. 7 and 8 indicate, the magnitude of the current flowing in the output circuit of the thyratron R during each firing operation is not dependent on the frequency with which firing occurs but is substantially constant for all firing frequencies. The average rate at which heat is supplied to the pyrometer body by the heating resistor L during any period in which the valve R is firing at regularly repeated intervals is thus proportional to the firing frequency, so that, for example, the average rate of heat supply with the operating conditions illustrated in Fig. 7 is two-fifths of the average rate of heat supply with the operating conditions illustrated in Fig. 8.

The control system of Fig. 2 is substantially unaffected in its accuracy of operation by normal variations in the voltage of the source which supplies the transformer U with energizing current. For example, when the voltage of said source is nominally 115 volts, variations in voltage between 90 volts and 130 volts will substantially not affect the accuracy with which the apparatus maintains the temperature of the pyrometer body A at the required value. This freedom from undesirable effects due to supply voltage fluctuations is obtained by energizing both the resistance bridge P and the thyratron R directly from the same source of alternating voltage. With this arrangement, upon an increase in the voltage supplied to the transformer primary winding 19, the anode-cathode voltage supplied to the thyratron R will be increased in a positive direction, which would normally tend to cause more heat to be supplied to the body A than that required to maintain the desired temperature of the body. However, in the apparatus of Fig. 2, such a supply voltage increase also produces an increase in the input and output voltages of the bridge P and in the fixed bias voltage $a$, with the result that the grid-cathode voltage supplied to the thyratron R will be increased. Due to the linearity of the grid-control characteristic of the thyratron R, this increase in grid-cathode voltage will compensate for the simultaneous increase in anode-cathode voltage, and erratic firing of the thyratron will be prevented.

Upon a decrease in the supply voltage, the apparatus of Fig. 2 functions in a manner similar to that described above to maintain stable operation of the system. That is, both the anode-cathode and grid-cathode voltages of the thyratron R will be decreased simultaneously, and hence one decrease will compensate for the other and therefore provide continued stable operation of the thyratron R.

While the values of the components and voltages employed in the system shown in Fig. 2 may vary widely, they should be properly related. In one operative embodiment of the system shown in Fig. 2, the voltages induced in the transformer secondary windings 15, 16, 17 and 18 are 15 volts, 225 volts, 270 volts and 6.3 volts, respectively. In that embodiment of the invention, the resistances and capacities of the various resistor and condenser elements are as follows:

Resistor

| | | |
|---|---|---|
| 10 | ohms | 1500 |
| 11 | do | 1500 |
| 12 | do | 1750 |
| 21 | do | 50 |
| 22 | megohm | 1.0 |
| 24 | do | 0.1 |
| 25 | ohms | 2500 |
| K | do | 1500 |
| L | do | 800 |

Condenser

| | | |
|---|---|---|
| 23 | mfd | 0.02 |
| 26 | mfd | 25.0 |
| 31 | mfd | 8.0 |
| W | mfd | 500.0 |

While in accordance with the provisions of the statutes, we have illustrated and described the best form of embodiment of our invention now known to us, it will be apparent to those skilled in the art that changes may be made in the form of the apparatus disclosed without departing from the spirit of the invention as set forth in the appended claims, and that in some cases certain features of our invention may be used to advantage without a corresponding use of other features.

Having now described our invention, what we claim as new and desire to secure by Letters Patent, is:

1. Electric control apparatus comprising in combination a load resistor, an electronic valve of the thyratron type having an anode, a cathode, and a control grid, a first pair of terminals adapted to be connected to a source of alternating current potential of a predetermined frequency, a connection between said cathode and a circuit point in the apparatus, conductors connecting said terminals and said load resistor in series between said anode and said circuit point and operative to apply an alternating current anode supply potential between said anode and said cathode, said valve being adapted to conduct current between said anode and said cathode during those of the positive half cycles of the anode supply potential in which said anode is rendered positive with respect to said cathode, in which the potential between said control grid and said cathode is less negative than a predetermined critical value corresponding to the then-existing value of the potential between said anode and said cathode, a second pair of terminals adapted to be connected to a source of alternating current potential of said frequency, conductors connecting said second terminals between said control grid and said circuit point and operative to apply an alternating current bias potential between said control grid and said cathode, a device having an output circuit and adapted to be energized with alternating current of said frequency and adapted, when so energized, to produce automatically in said output circuit an alternating current output signal of a magnitude dependent upon the value of a quantity, means coupling said output circuit between said control grid and said circuit point and operative to apply said output signal between said control grid and said cathode, and means included in said connection and operative to cause the ones of said positive half cycles in which said valve conducts current to recur at a rate dependent upon the magnitude of said output signal, comprising a bias resistor connected between said cathode and said circuit point and a condenser connected in parallel with said bias resistor to develop a cathode bias potential across said bias resistor and said condenser when said valve is conductive, the resistance of said bias resistor and the capacity of said condenser being so chosen and related that the time required for said cathode bias potential to drop substantially to zero when said valve is non-conductive is at least as great as the time required for a plurality of successive cycles of said alternating current potentials, whereby the relation between said critical value and the resultant of said output signal, said bias potential, and said cathode bias potential applied between said control grid and said cathode determines the frequency with which said valve becomes conductive.

2. Apparatus as specified in claim 1, wherein said device comprises a bridge circuit having a pair of output terminals included in said output circuit and having a pair of input terminals and a plurality of impedances interconnecting said input and output terminals, at least one of said impedances being adjustable in value in accordance with said value of said quantity, wherein there is included a third pair of terminals adapted to be connected to a source of alternating current potential of said frequency, and wherein there are included conductors connecting said bridge circuit input terminals respectively to said third terminals, said bridge circuit thereby being operative to produce said output signal between said output terminals, and to control automatically the magnitude of said output signal in accordance with the adjusted value of said one of said impedances.

3. Apparatus as specified in claim 2, wherein there is included a transformer having a primary winding and a plurality of secondary windings, wherein the ends of said primary winding are connected between a pair of terminals adapted to be connected to a source of alternating current potential of said frequency, and wherein said first, second, and third pairs of terminals constitute, respectively, the ends of a first, a second, and a third one of said secondary windings.

WILLIAM H. WANNAMAKER, Jr.
JAMES C. MOUZON.

References Cited in the file of this patent

UNITED STATES PATENTS

| Number | Name | Date |
|---|---|---|
| 2,188,611 | Norton | Jan. 30, 1940 |
| 2,266,516 | Russell | Dec. 16, 1941 |
| 2,274,992 | Nelsen | Mar. 3, 1942 |
| 2,522,492 | Andersen | Sept. 19, 1950 |

OTHER REFERENCES

Technique of Microwave Measurements (Montgomery), McGraw-Hill, New York, 1947 (page 124 relied on).